United States Patent
Miller

[15] 3,659,405
[45] May 2, 1972

[54] QUICK DETACHABLE BRACE RODS FOR COMBINE

[72] Inventor: Ronald D. Miller, Shawnee, Kans.
[73] Assignee: Allis-Chalmers Manufacturing Company, Milwaukee, Wis.
[22] Filed: July 31, 1970
[21] Appl. No.: 59,929

[52] U.S. Cl. .................................56/15.6, 56/DIG. 9
[51] Int. Cl. ..............................................A01d 41/02
[58] Field of Search..............................56/14.6, 15.6, DIG. 9

[56] References Cited

UNITED STATES PATENTS 3,026,664  3/1962  Beach et al. ............................56/15.6
3,503,190  3/1970  Van Der Lely ......................56/14.6 X
2,369,745  2/1945  Millard et al. .........................56/14.6
2,867,958  1/1959  Allen..............................56/15.6 UX Primary Examiner—Louis G. Mancene
Assistant Examiner—J. A. Oliff
Attorney—Kenneth C. McKivett, Robert B. Benson and Arthur L. Nelson

[57] ABSTRACT

This invention relates to quick detachable brace rods positionable between a header and a main body of a combine harvester and wherein the rods can be easily adjusted as to length and readily locked into position and when detached at one end, such brace rods can be readily carried on the header parallel thereto.

1 Claims, 3 Drawing Figures

PATENTED MAY 2 1972
3,659,405
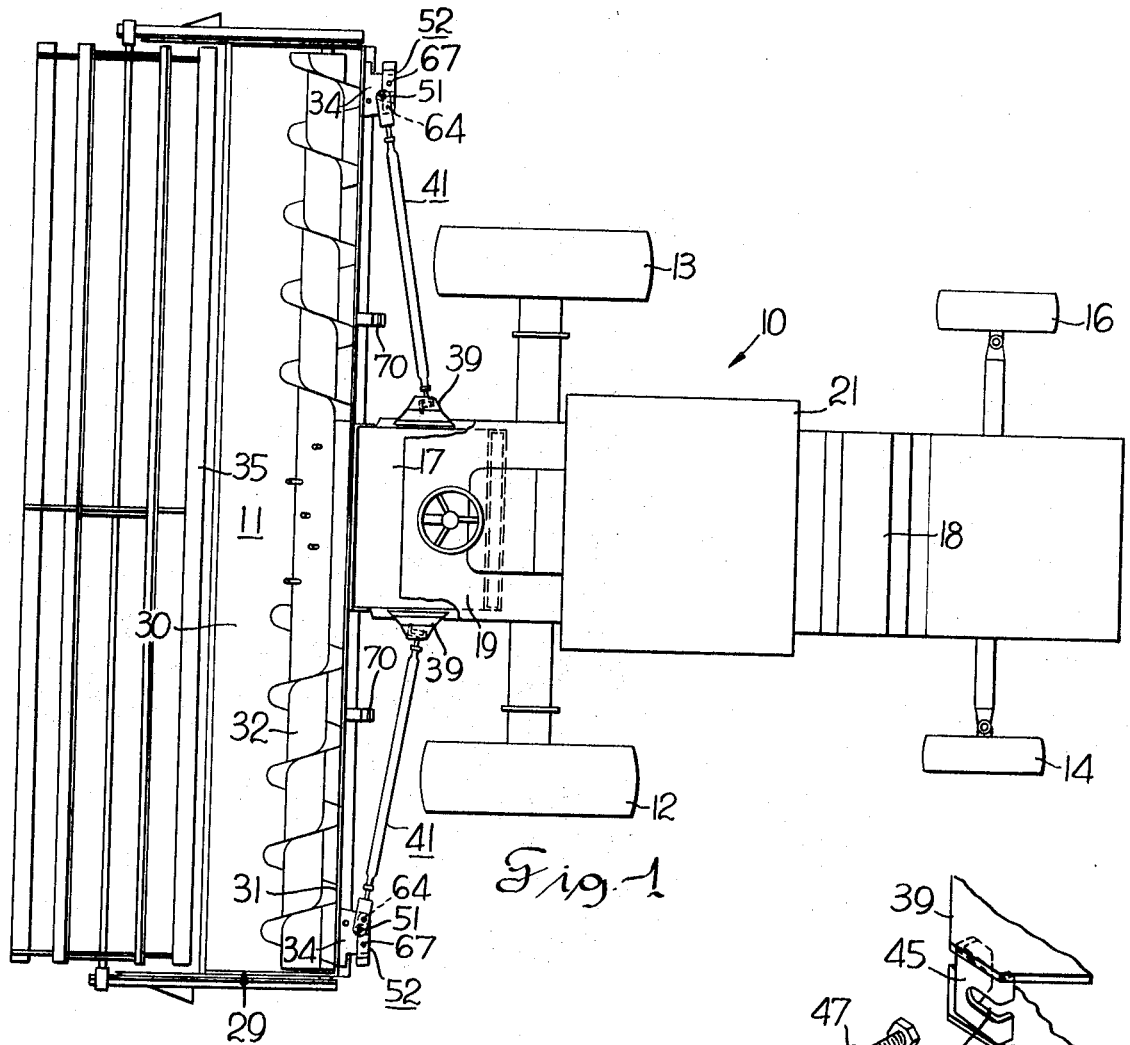
Fig-1
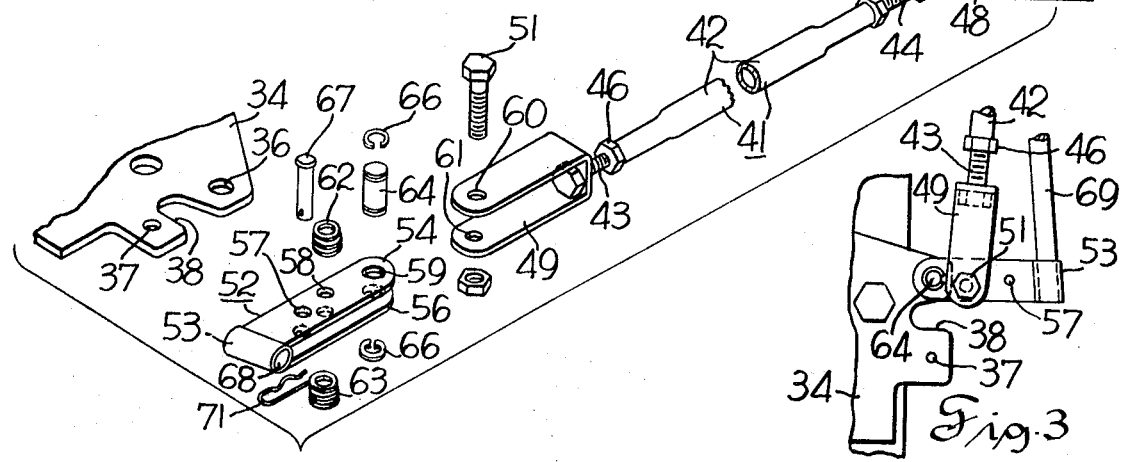
Fig-2
Fig-3
Inventor
Ronald D. Miller
By Kenneth C. McKivett
Attorney

QUICK DETACHABLE BRACE RODS FOR COMBINE

In order to meet prevailing highway restrictions, the header of large combines must be detached from the rest of the machine so that the header can be arranged lengthwise on a trailer for highway travel rather than crosswise as it would be if left in its normal position on the main body of the machine. The work heretofore involved in separating the header from and reinstalling it on the main body of the machine has usually been cumbersome and time consuming because it required the removal and reinsertion of a large number of connecting bolts, and also a good deal of maneuvering and prying in order to release the bolts for withdrawal and to align the bolt holes for reinsertion of the bolts.

Generally, it is an object of the invention to provide an improved detachable header mounting which will take care of the hereinabove mentioned difficulties in a practical and entirely satisfactory manner.

More specifically it is an object of this invention to provide an improved harvester-thresher which may be prepared for separation of the header from the main body by releasing a relatively small number of locking elements, preferably in the form of toggle braces and locking elements in the form of wedges, subsequent actual separation of the header being accomplished by rearward movement of the main body away from the header.

As the size of combine harvesters have grown, it has become necessary to provide brace members on each side of the combine bracingly connecting the header to the main body. When the header is to be disconnected from the main body, it is of course necessary to disconnect these brace members and when reconnecting the header to the main body these brace members must be reconnected.

It is an object of this invention to provide brace rods which can be connected or disconnected between a header and main body without the use of special tools and without requiring any skill or exertion.

A further object of this invention is to provide brace rods which are readily adjustable for taking up tolerances permitted in manufacture of the harvester.

These and other objects and advantages are attained by the present invention various novel features of which will be apparent from the description herein and the accompanying drawings disclosing an embodiment of the invention, and will be more particularly pointed out in the appended claims.

In the drawings:

FIG. 1. is a plan view of a self-propelled harvester-thresher with the brace rods of this invention attached thereto;

FIG. 2. is an exploded isometric view of the adjustable brace rod, toggle mechanism, and mounting plates; and FIG. 3. is a plan view of the toggle mechanism in position for removal of the brace rod assembly from the socket assembly.

The combine shown in FIG. 1 consists of two principal units, namely, a mobile longitudinal body structure generally indicated by the reference numeral 10, and a transversely extending header structure generally indicated by the reference numeral 11. The body structure 10 is of generally conventional construction in that it includes a pair of laterally spaced front driving wheels 12 and 13, a pair of laterally spaced dirigible rear wheels 14 and 16, a separation mechanism enclosed within a housing 17, and an engine 18 for supplying power to the driving wheels 12 and 13 and to other driven parts of the combine. The body structure 10 further includes an operator's station 19, a grain bin 21, and a thresher mechanism enclosed within a housing or narrow throat portion 17 at the forward end of the body structure. The thresher housing 17 is pivoted for selective up and down adjustment to different elevated positions above the ground affording desired cutting heights of the header structure. Up and down adjustment of the thresher housing 17 about the pivot is accomplished in a conventional manner by a pair of hydraulic rams (not shown) and a control mechanism including a handlever (not shown) at the operator's station 19.

The header structure 11 like the body structure 10, conforms generally with established principles of construction and operation. That is the header structure 11 includes a cutting mechanism (not shown) of the reciprocating sickle bar type which extends across the full width of the header, and an L-shaped pan or trough 29 which has a generally horizontal bottom wall 30 to the rear of cutting mechanism and a rear wall 31 extending upwardly from bottom wall 30. The header structure further includes a conventional transverse auger 32 within the pan 29, and a conventional sweep reel 35. The entire header structure including the cutting mechanism, pan, auger and reel is detachably secured to the forward end of the thresher housing 17 in a manner which greatly facilitates the work of detaching the header structure from, and reattaching it to, the body structure of the combine. For further details as to how the header structure is attached or detached from the body structure reference may be had to U.S. Pat. No. 2,867,958 which issued Jan. 13, 1959.

The upper portion of wall 31 is provided with a pair of plates 34 which are attached to wall 31 at equal spacing from the longitudinal center line of body structure 10. Each plate 34 is provided with a pair of holes 36, 37 and a notch 38. A pair of socket assemblies 39 are attached to opposite sides of thresher housing 17. A pair of brace rod assemblies 41 are adapted to be attached between socket assemblies 39 and plates 34 for bracingly connecting header 11 to body structure 10. Brace rod assembly 41 includes a central brace member 42 which is internally threaded at each end to receive bolts 43 and 44. A jam nut 46 is threadably engaged with bolt 43 and a jam nut 47 is threadably engaged with bolt 44. Socket assembly 39 is provided with a generally vertically extending portion 45 having a transversely extending slot 48 therein adapted to receive the shank of bolt 44. Slot 48 provides an opening which is smaller than the head of bolt 44. One end of a clevis 49 is received about bolt 43 and the other end is pierced to receive a bolt 51.

A latch arm assembly 52 includes a pipe portion 53 having a pair of parallel extending plates 54 and 56 attached thereto as by welding. Plates 54 and 56 are provided with three vertical holes therethrough 57, 58 and 59. Plates 54 and 56 are designed to be received between the arms of clevis 49. Holes 58 in plates 54 and 56 are aligned with holes 60, 61 in clevis 49 and these holes pivotally receive bolt 51. Arms 54 and 56 are separated from the arms of clevis 49 by means of washers 62 and 63 which are mounted about bolt 51. Latch arm assembly 52 is pivotally connected to plate 34 by means of pivot pin 64 which is received in holes 59 and hole 36 and such pin is retained in position by snap rings 66. Holes 57 in arms 54 and 56 are aligned with hole 37 in plate 34 which is received between arms 54 and 56 and these holes receive pin 67 which retains latch arm assembly in the latching position.

Now assuming that the header 11 is connected to the body portion 10 as shown in FIG. 1 and it is desired to disconnect the header for purposes of transport or storage, one of the first things to be done is to remove the brace rod assemblies 41. This is accomplished by removing pins 67 and inserting a pry member 69 (see FIG. 3) into hole 68 in pipe member 53 and causing brace rod assembly 41 to pivot about pin 64 generally away from plate 34. This results in providing some slack in the header brace assembly 41 so that the head of bolt 44 can be slid out from in back of vertical portion 45 by moving the shank of bolt 44 transversely in slot 48. Header brace assembly 41 can now be pivoted about pin 64 until it is extending parallel to the rear wall 31. The unattached end of the brace assembly can now be inserted into spring clip 70 carried by rear wall 31. After both brace assemblies have been thus disconnected the header can then be removed in the manner described in U.S. Pat. No. 2,867,958.

From FIG. 2, it is seen that the length of the brace rods can be varied by adjusting bolts 43 and 44 and once they have been adjusted to provide the proper length then no further adjustment of them will be necessary except for wear of the parts.

The installations of the brace rods would be handled in the same manner that the brace rods were removed excepting the steps taken being in the opposite order. In other words, to install the braces the free end of the brace resting on spring clip 70 is removed from the spring clip and the assembly is pivoted about pin 64 until the shank of bolt 44 can be inserted in slot 48 with the head of bolt 44 being positioned behind vertical member 45. A round tool 69 is inserted in hole 68 and latch arm assembly 52 is pivoted about pivot pin 64 until holes 57 are aligned with hole 37 at which time pin 67 is inserted in the holes and locked in place by quick hitch pin 71.

This round tool 69 referred to as being inserted in hole 68 is a tool commonly found in combines for opening concave doors, however any type of bar or pipe which will be received in hole 68 would be adequate.

It is to be noted that when latch arm assembly 52 is so positioned that holes 57 are aligned with hole 37, at this point bolt 51 will be received in notch 38. This assembly 52 could be described as a toggle joint wherein instead of using an over-center locking mechanism a more positive locking pin 67 arrangement is utilized.

The embodiments of the invention in which an exclusive property or privilege is claimed are defined as follows:

1. In a harvester-thresher including a relatively narrow body portion and a wide header detachably mounted on the forward end of said body portion, the improvement comprising an adjustable brace member extending diagonally from said body portion to said header and including removable means for locking said brace member in bracing position between said body portion and said header and when said locking means are moved one end of said brace member being slidably removable from said body portion for pivoting said brace member to a position parallel to said header, said locking means including a plate carried by said header, said plate being provided with a pair of openings therethrough positioned adjacent end portions of said plate, said plate having a notched out portion positioned between said pair of openings, a strap member pivotally connected to a pin received in one of said openings, the other end of said brace member being pivotally connected to said strap member by a pivot bolt adjacent said pin, said strap member being provided with an opening which is alignable with the other opening in said plate for receiving a hitch pin for locking said strap member and brace in bracing position, said pivot bolt being received in said notched out portion in said plate when said brace member is in bracing relation, and means on the other end of said strap member for receiving a tool for pivoting said strap member about said pin.

* * * * *